United States Patent
Bu

(10) Patent No.: US 8,106,824 B2
(45) Date of Patent: Jan. 31, 2012

(54) TRACKING SATELLITE SIGNAL

(75) Inventor: Sung Chun Bu, Seoul (KR)

(73) Assignee: Core Logic, Inc., Seoul (KR)

( * ) Notice: Subject to any disclaimer, the term of this patent is extended or adjusted under 35 U.S.C. 154(b) by 427 days.

(21) Appl. No.: 12/364,437

(22) Filed: Feb. 2, 2009

(65) Prior Publication Data

US 2009/0231193 A1 Sep. 17, 2009

(30) Foreign Application Priority Data

Feb. 1, 2008 (KR) .................. 10-2008-0010614

(51) Int. Cl.
*G01S 19/29* (2010.01)
*G01S 19/30* (2010.01)
(52) U.S. Cl. .......... 342/357.68; 342/357.69; 342/357.15
(58) Field of Classification Search ............. 342/357.15, 342/357.68, 357.69
See application file for complete search history.

(56) References Cited

U.S. PATENT DOCUMENTS

| | | | | | |
|---|---|---|---|---|---|
| 4,114,155 | A | * | 9/1978 | Raab | 342/394 |
| 4,621,365 | A | * | 11/1986 | Chiu | 375/149 |
| 5,134,407 | A | * | 7/1992 | Lorenz et al. | 342/352 |
| 5,203,030 | A | * | 4/1993 | Kawasaki | 455/164.2 |
| 5,260,972 | A | * | 11/1993 | Wang | 375/285 |
| 5,363,110 | A | * | 11/1994 | Inamiya | 342/357.31 |
| 5,748,686 | A | * | 5/1998 | Langberg et al. | 375/367 |
| 6,590,889 | B1 | * | 7/2003 | Preuss et al. | 370/342 |
| 6,990,141 | B1 | * | 1/2006 | Iwasaki | 375/150 |
| 7,039,091 | B1 | * | 5/2006 | Mauer | 375/140 |
| 2011/0006946 | A1 | * | 1/2011 | Yu et al. | 342/357.69 |

* cited by examiner

*Primary Examiner* — Thomas Tarcza
*Assistant Examiner* — Frank McGue
(74) *Attorney, Agent, or Firm* — Edwards Wildman Palmer LLP

(57) ABSTRACT

Techniques, systems and apparatus are described for tracking a satellite signal. In one aspect, an apparatus includes a tracking module to generate a satellite-based measurement result by tracking a satellite signal received from a satellite. The tracking module includes sub-tracking modules with each sub-tracking module configured to generate the satellite-based measurement result by using a different integral time.

20 Claims, 5 Drawing Sheets

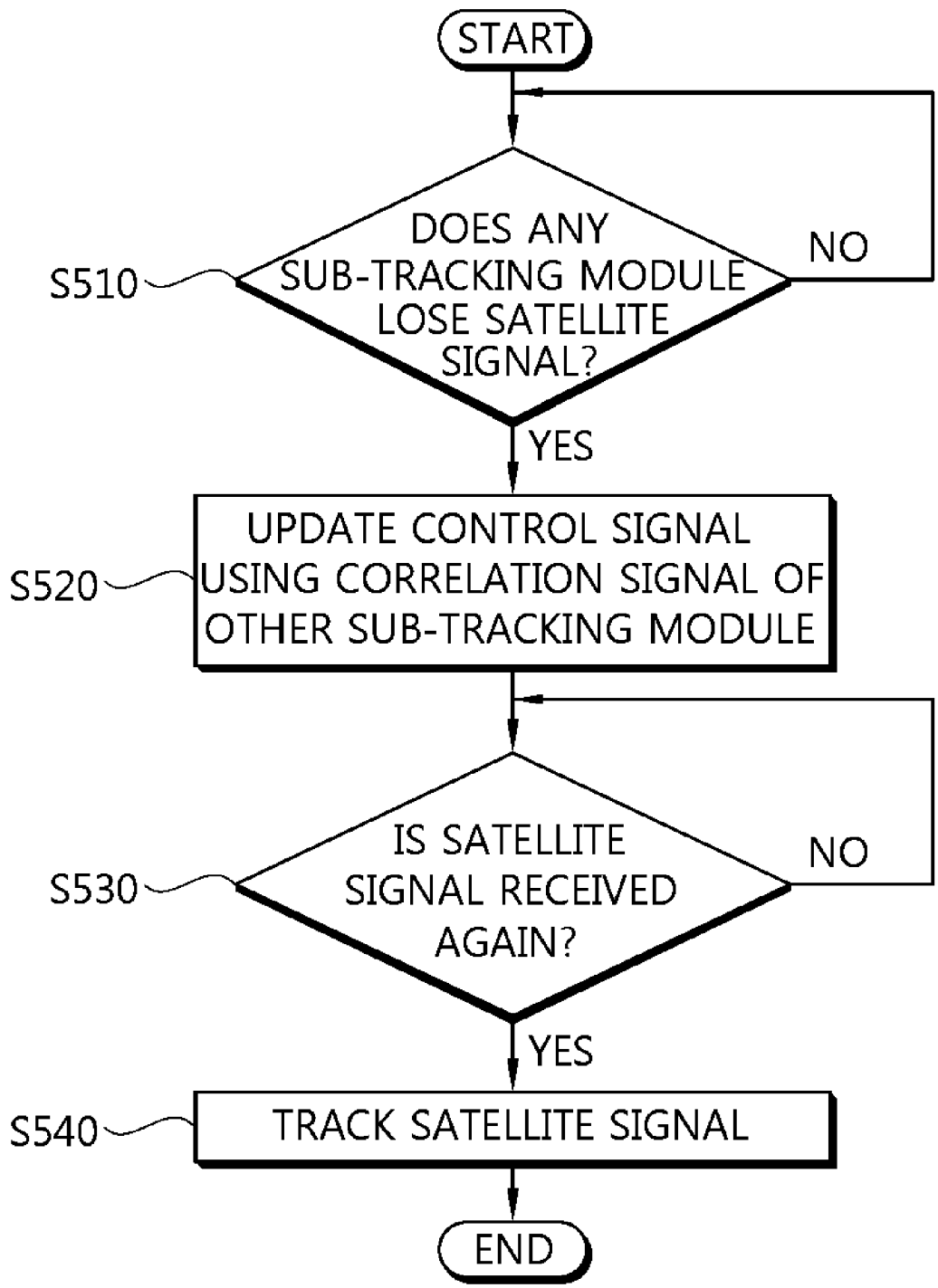

TRACKING SATELLITE SIGNAL

CROSS-REFERENCE TO RELATED APPLICATIONS

This application claims the benefit of priority of Korean Patent Application No. 10-2008-010614 filed on Feb. 1, 2008, which is incorporated by reference in its entirety herein.

BACKGROUND

The present disclosure relates to signal tracking and, more particularly, to an apparatus and method for tracking a satellite signal.

A global navigation satellite system (GNSS) tracks the location of a target on the ground by using a network of artificial satellites staying afloat in the space. GNSS refers to the general global positioning system (GPS) operated by the U.S. Department of Defense, the Galileo positioning system being developed by the European Union, a global navigation satellite system (GLONASS) operated by Russia, and the like. The GNSS is extensively employed to acquire the location of aircrafts, vehicles, ships, etc. and also adapted for information technologies such as telematics and the like.

Typically, the GPS, a satellite navigation system providing location information by using satellites orbiting in the space, was established for the military purpose at an early stage, and since selective availability, namely, an intentional noise, was removed in 2000, it has been widely employed in various fields. The GPS satellites share frequency bands with different codes by using a code division multiple access (CDMA) scheme.

A GPS receiver measures its location by using signals from at least three satellites. A single tracking module is allocated to a single satellite to acquire a measurement result. The measurement result is data acquired based on satellite signals, which may be three-dimensional rectangular coordinates data on the earth, such as x, y, and z, or data for determining the rectangular coordinates. Conventionally, the GPS receiver includes 12 or 16 tracking modules.

In order to enhance the reliability of the GPS receiver, performance of the tracking modules for tracking satellite signals is critical. The strength of satellite signals may be severely changed due to Doppler effect or a change in a line of sight (LOS) caused by the movement of the GPS receiver. If the tracking modules fail to properly track such change in the satellite signals, a success rate of acquiring the measurement results would be sharply lowered. If a signal sensitivity of the tracking module is reduced, the measurable strength of satellite signals may be reduced so that measurement results cannot be obtained. On the contrary, if the signal sensitivity is increased, a measurement error may be increased.

SUMMARY

Techniques, systems and apparatus are described for tracking a satellite signal while coping with a change in dynamic characteristics of a satellite signal. For example, the techniques, systems and apparatus can be implemented to provide a GPS receiver capable of coping with a change in dynamic characteristics of a satellite signal.

An apparatus includes a tracking module to generate a satellite-based measurement result by tracking a satellite signal received from a satellite. The tracking module includes sub-tracking modules with each sub-tracking module configured to generate the satellite-based measurement result by using a different integral time.

Implementations can optionally include one or more of the following features. At least one of the sub-tracking modules can include an accumulator to generate a correlation signal by accumulating the received satellite signal by using a corresponding integral time. The at least one of the sub-tracking modules can include a tracking loop in communication with the accumulator to generate the satellite-based measurement result based on the generated correlation signal. The at least one of the sub-tracking modules can include a carrier remover in communication with the tracking loop to remove a carrier, which has been applied by the satellite, from the satellite signal and generate a carrier-removed signal. The at least one of the sub-tracking modules can include a code remover in communication with the tracking loop and the carrier remover to remove a code, which has been applied by the satellite, from the carrier-removed signal and generate a code-removed signal. The accumulator can be in communication with the code remover to generate the correlation signal based on the code-removed signal received from the code remover. The tracking loop can be configured to output a control signal that controls the carrier remover and the code remover to lock the satellite signal. When a signal strength of the received satellite signal is lower than a threshold value, the tracking loop can be configured to output the control signal that controls the carrier remover and the code remover by using the satellite signal received by other sub-tracking modules. Each sub-tracking module can have different signal sensitivity to the satellite signal. A length of the integral time for each sub-tracking module can be inversely proportional to the signal sensitivity of the satellite signal. A length of the integral time for each sub-tracking module can be inversely proportional to sensitivity of each sub-tracking module to dynamic characteristics of the satellite signal. The different integral time for each sub-tracking module can be sequentially set based on acquisition of synchronization with the received satellite signal.

In another aspect, a method includes receiving a satellite signal from a satellite. Also, the received satellite signal is tracked by integrating the received satellite signal based on each of different integral times.

Implementations can optionally include one or more of the following features. Receiving the satellite signal can include removing a carrier, which has been applied by the satellite, from the satellite signal to generate a carrier-removed signal; and removing a code, which has been applied by the satellite, from the carrier-removed signal. Tracking the satellite signal can include integrating the received satellite signal by using each of the different integral times to generate correlation signals. When one of the generated correlation signals has lost the satellite signal, the satellite signal can be tracked by using the other remaining correlation signals.

In another aspect, a global positioning system (GPS) receiver can include tracking modules to track satellite signals received from GPS satellites to generate satellite-based measurement results, each tracking module tracking a corresponding GPS satellite. The GPS receiver includes a satellite processor in communication with the tracking modules to receive the generated satellite-based measurement results and obtain a position solution from the received satellite-based measurement results. At least one of the tracking modules includes a first sub-tracking module to track one of the satellite signals received from the corresponding GPS satellite by using a first integral time; and a second sub-tracking module to track the same satellite signal tracked by the first sub-tracking module and received from the corresponding GPS satellite by using a second integral time.

Implementations can optionally include one or more of the following features. The at least one of the tracking modules can include a third sub-tracking module to track the same satellite signal tracked by the first sub-tracking module and received from corresponding the GPS satellite by using a third integral time. Each sub-tracking module can include an accumulator to generate a correlation signal by accumulating the one of the satellite signals by using a corresponding integral time. Each sub-tracking module can include a tracking loop in communication with the accumulator to receive the generated correlation signal and generate a satellite-based measurement value from the received correlation signal. Each sub-tracking module can include a carrier remover in communication with the tracking loop to remove a carrier, which has been applied by the satellite, from the satellite signal and generate a carrier-removed signal. Each sub-tracking module can include a code remover in communication with the tracking loop and the carrier remover to remove a code, which has been applied by the satellite, from the carrier-removed signal and generate a code-removed signal. The accumulator can be in communication with the code remover to generate the correlation signal based on the code-removed signal received from the code remover. The tracking loop can be configured to output a control signal that controls the carrier remover and the code remover to lock the satellite signal. When a signal strength of the received corresponding satellite signal is lower than a threshold value, the tracking loop is configured to output the control signal that controls the carrier remover and the code remover by using the satellite signal received by other sub-tracking modules. Each sub-tracking module can have different signal sensitivity to the received one of the satellite signals. A length of the integral time for each sub-tracking module can be inversely proportional to the signal sensitivity of the satellite signal.

In another aspect, a system includes tracking modules to track satellite signals received from GPS satellites to generate satellite-based measurement results, each tracking module tracking a corresponding GPS satellite. The system includes a satellite processor in communication with the tracking modules to receive the generated satellite-based measurement results and obtain a position solution from the received satellite-based measurement results. Each tracking module includes sub-tracking modules to track a corresponding satellite signal. The sub-tracking modules includes a first sub-tracking module to track the corresponding satellite signal received from a corresponding GPS satellite by using a first integral time; a second sub-tracking module to track the same satellite signal tracked by the first sub-tracking module using a second integral time; and a third sub-tracking module to track the same satellite signal tracked by the first and second sub-tracking modules using a third integral time. Each sub-tracking module includes an accumulator to generate a correlation signal by accumulating the one of the satellite signals by using a corresponding integral time; and a tracking loop in communication with the accumulator to receive the generated correlation signal and generate a satellite-based measurement value from the received correlation signal. Each sub-tracking module further includes a carrier remover in communication with the tracking loop to remove a carrier, which has been applied by the satellite, from the satellite signal and generate a carrier-removed signal; and a code remover in communication with the tracking loop and the carrier remover to remove a code, which has been applied by the satellite, from the carrier-removed signal and generate a code-removed signal. The accumulator is in communication with the code remover to generate the correlation signal based on the code-removed signal received from the code remover.

By tracking a satellite signal according to a change in dynamic characteristics of the satellite signal, signal re-acquisition can be quickly performed and a position resolution with high reliability can be obtained. Thus, the reliability of the GPS receiver can be enhanced.

BRIEF DESCRIPTION OF THE DRAWINGS

FIG. 5 is a flow chart illustrating a method for tracking a satellite signal.

DETAILED DESCRIPTION

Techniques, apparatus and systems are described for tracking a satellite signal that may satisfy both the dynamic characteristics according to the change in a satellite signal and signal sensitivity. The techniques, systems and apparatus for tracking a satellite signal may be applied for a global navigation satellite system (GNSS) that determines a location by using the satellite signal received from an artificial satellite or a system that provides a multimedia service by using the satellite signal. The GNSS may use any satellite of a global positioning system (GPS), Galileo positioning system, a global navigation satellite system, and the like. In this disclosure, a GPS satellite refers to a satellite providing a satellite signal to the ground without being limited to a satellite applied for any particular system.

Figure 1:
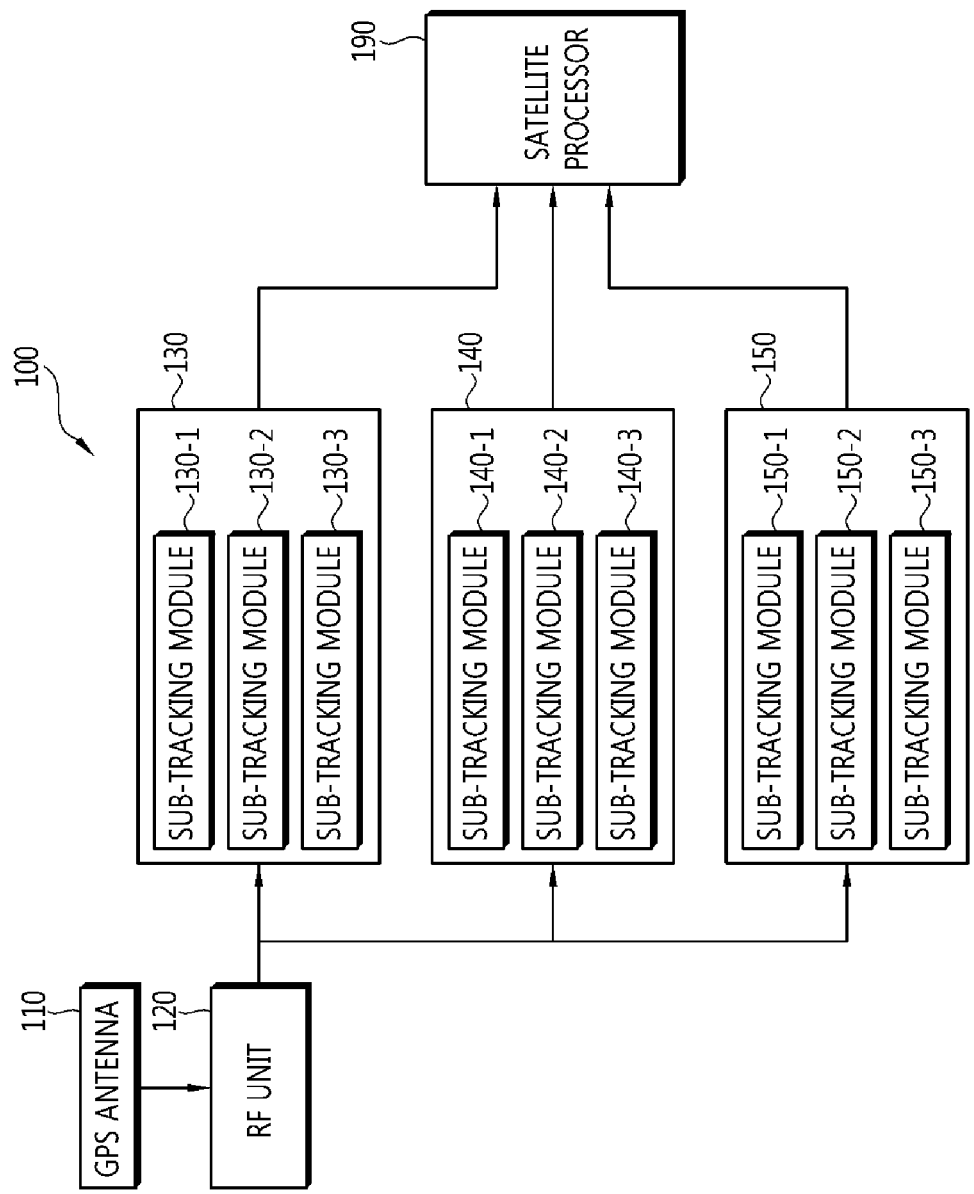
FIG. 1 is a schematic block diagram showing the configuration of a GPS receiver according to an embodiment of the present disclosure.

FIG. 1 is a schematic block diagram showing an example configuration of a GPS receiver. A GPS receiver 100 includes a GPS antenna 110, a radio frequency (RF) unit 120, tracking modules 130 to 150, and a satellite processor 190.

A composite of signals from various GPS satellites is received using a GPS antenna 110 and applied by the RF unit 120. The received signals of the respective GPS satellites are tracked by the respective tracking modules 130 to 150. Each of the tracking modules 130 to 150 tracks a satellite signal for a single satellite. Each of the tracking modules 130 to 150 includes multiple sub-tracking modules. For the example shown in FIG. 1, a first tracking module 130 includes three sub-tracking modules 130-1, 130-2, and 130-3; a second tracking module 140 includes three sub-tracking modules 140-1 to 140-3; and a third tracking module 150 includes three sub-tracking modules 150-1 to 150-3.

Each of the tracking modules 130 to 150 is a satellite tracking device that outputs a satellite-based measurement result. The satellite-based measurement result is a measurement result generated by tracking the satellite signal. The satellite-based measurement result may include information for acquiring a signal strength of the satellite signal and/or information for acquiring position solution of the GPS receiver 100. The satellite processor receives information including the generated satellite-based measurement result from the tracking modules 130 to 150 and processes the received information. The satellite processor 190 determines a position solution based on the satellite-based measurement results. The determined position solution may be used for route (course) data or the like.

While FIG. 1 shows three tracking modules 130-150, this is done for illustrative purposes only. Any number of tracking modules can be implemented in the GPS receiver. For example, 1 to 12 tracking modules can be implemented. Thus, the number of tracking modules included in the GPS receiver is not meant to be limited.

Also, while the tracking modules are shown to include three sub-tracking modules, there is no limit to the number of sub-tracking modules in each tracking module. A tracking module may include any number of sub-tracking modules. Further, each tracking module may include the same number of sub-tracking modules or different number of sub-tracking modules. For example, a first tracking module can include three sub-tracking modules and a second tracking module can include four sub-tracking modules.

The respective tracking modules 130 to 150 track a satellite signal for a single satellite, so their operations and functions are the same. The following is described with respect to the first tracking module 130 for illustrative purposes only. The same can be applied to all tracking modules.

The three example sub-tracking modules 130-1 to 130-3 in the tracking module 130 tracks a satellite signal for a satellite by using a different integral time. An integral time represents the duration for integration (or accumulation). For example, a first sub-tracking module 130-1 may perform integration at an integral time of 1 ms which corresponds to the period of a coarse acquisition (C/A) code. A second sub-tracking module 130-2 may perform integration at an integral time of 20 ms which corresponds to the period of data bits. A third sub-tracking module 130-3 may perform integration at an integral time of 20 ms or more (e.g., 20 ms to 100 ms).

Different integral times may be set sequentially for the sub-tracking modules 130-1 to 130-3 based on acquisition of synchronization with a satellite signal. For example, when the sub-tracking modules 130-1 to 130-3 receive a satellite signal at an early stage, all of them begin integration with an initial integral time, such as 1 ms. When bit synchronization is acquired, the first sub-tracking module 130-1 continuously performs integration at the initial integral time of 1 ms while the second and third sub-tracking modules 130-2 and 130-3 perform integration at the next sequential integral time, such as 20 ms. Thereafter, when frame synchronization is acquired, the first sub-tracking module 130-1 continues to perform integration at the initial integral time of 1 ms, the second sub-tracking module 130-2 continues to perform integration at the next integral time of 20 ms, but the third sub-tracking module 130-3 performs integration at the next sequential integral time, such as an integral time of more than 20 ms. The bit synchronization refers to searching for a transition position of data bits based on the result value obtained by performing integration by the time unit of 1 ms, and starting an operation at the corresponding position.

Due to the different integral times, each of the sub-tracking modules 130-1 to 130-3 has different signal sensitivity. Having different signal sensitivity indicates that each of the sub-tracking modules 130-1 to 130-3 can track different signal strengths. For example, the first sub-tracking module 130-1 may track a satellite signal of up to −145 dBm, the second sub-tracking module 130-2 may track a satellite signal of up to −153 dBm, and the third sub-tracking module 130-3 may track a satellite signal of up to −160 dBm.

Figure 2:
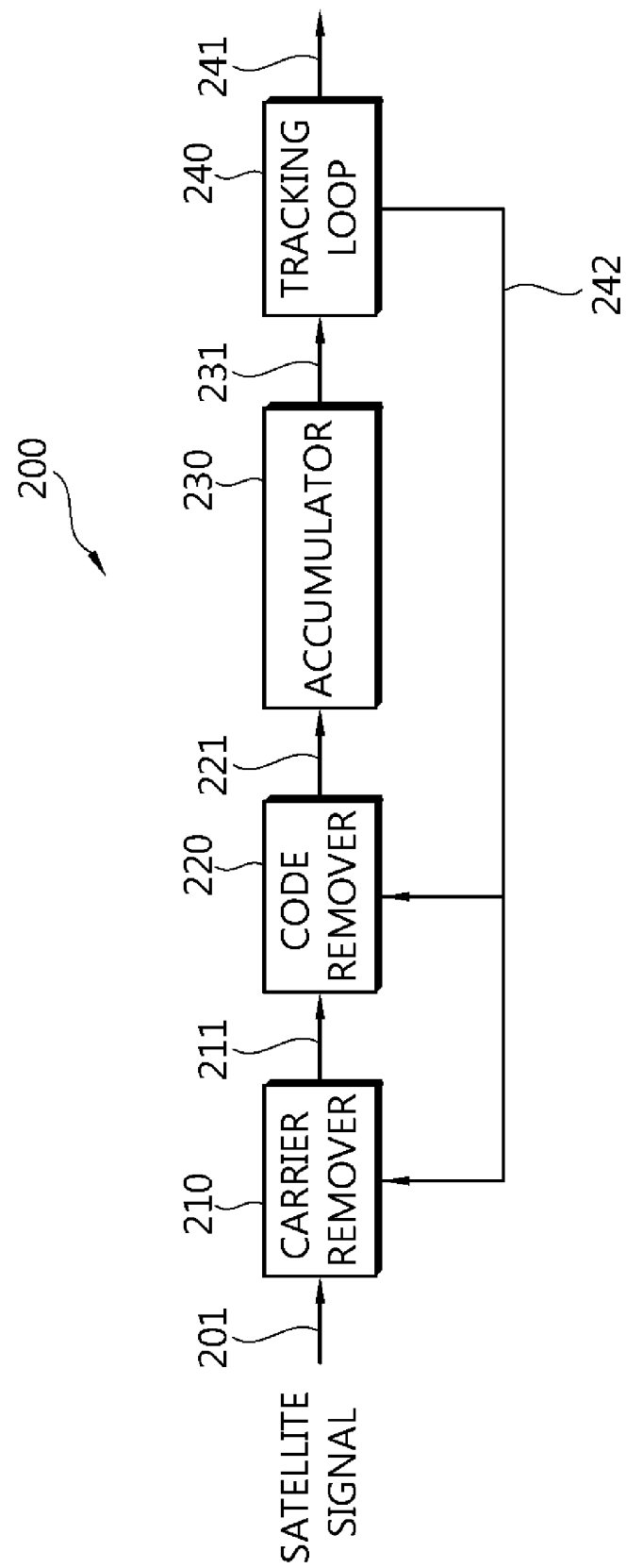
FIG. 2 is a schematic block diagram showing the configuration of a sub-tracking module of FIG. 1.

FIG. 2 is a schematic block diagram showing an example configuration of a sub-tracking module. The sub-tracking module 200 can be implemented the same as each of the sub-tracking modules (e.g., 130-1 to 130-3) shown in FIG. 1.

The sub-tracking module 200 includes a carrier remover 210, a code remover 220, an accumulator 230, and a tracking loop 240.

The carrier remover 210 removes a carrier from a satellite signal 201. A satellite applies the carrier to the satellite signal and combines the applied carrier with the satellite signal. Thus, the carrier remover 210 removes from the satellite signal 201, the same carrier applied by the satellite, and the resultant signal is a carrier-removed signal 211. The code remover 220 removes a code from the carrier-removed signal 211 by using a copy of the code the satellite applied to the satellite signal 201. The resultant signal is a carrier and code removed signal 221. The carrier remover 210 and the code remover 220 removes the carrier and the code from the satellite signal to generate the carrier and the code based on a control signal 242 provided by the tracking loop 240.

The accumulator 230 accumulates (integrates) the carrier and code removed signal 221 outputted from the code remover 220 for an integral time. Based on the accumulation or integration, the accumulator 230 outputs a correlation signal 231.

The tracking loop 240 generates a satellite-based measurement result by using the correlation signal 231. In addition, the tracking loop 240 generates the control signal 242 based on a change in the satellite signal and provides the generated control signal 242 to the carrier remover 210 and the code remover 220. Because the satellite signal may be distorted due to a Doppler effect or the like, the control signal 242 controls the carrier applied by the carrier remover 210 and the code applied by the code remover 220 to compensate for the distortion. The tracking loop 240 generates the control signal 242 to reduce or eliminate any delay between the code applied by the satellite, which has transmitted the satellite signal 201, and the code removed and copied by the code remover 220. Also, the tracking loop 240 generates the control signal 242 so that the frequency and phase of the carrier of the satellite signal 201 and those of the copied carrier can be the same. This is called locking of the satellite signal 201. In order to lock the satellite signal 201, the tracking loop 240 may apply a frequency lock loop (FLL) or a phase lock loop (PLL) for carrier tracking and apply a delay lock loop (DLL) for code tracking.

Figure 3:
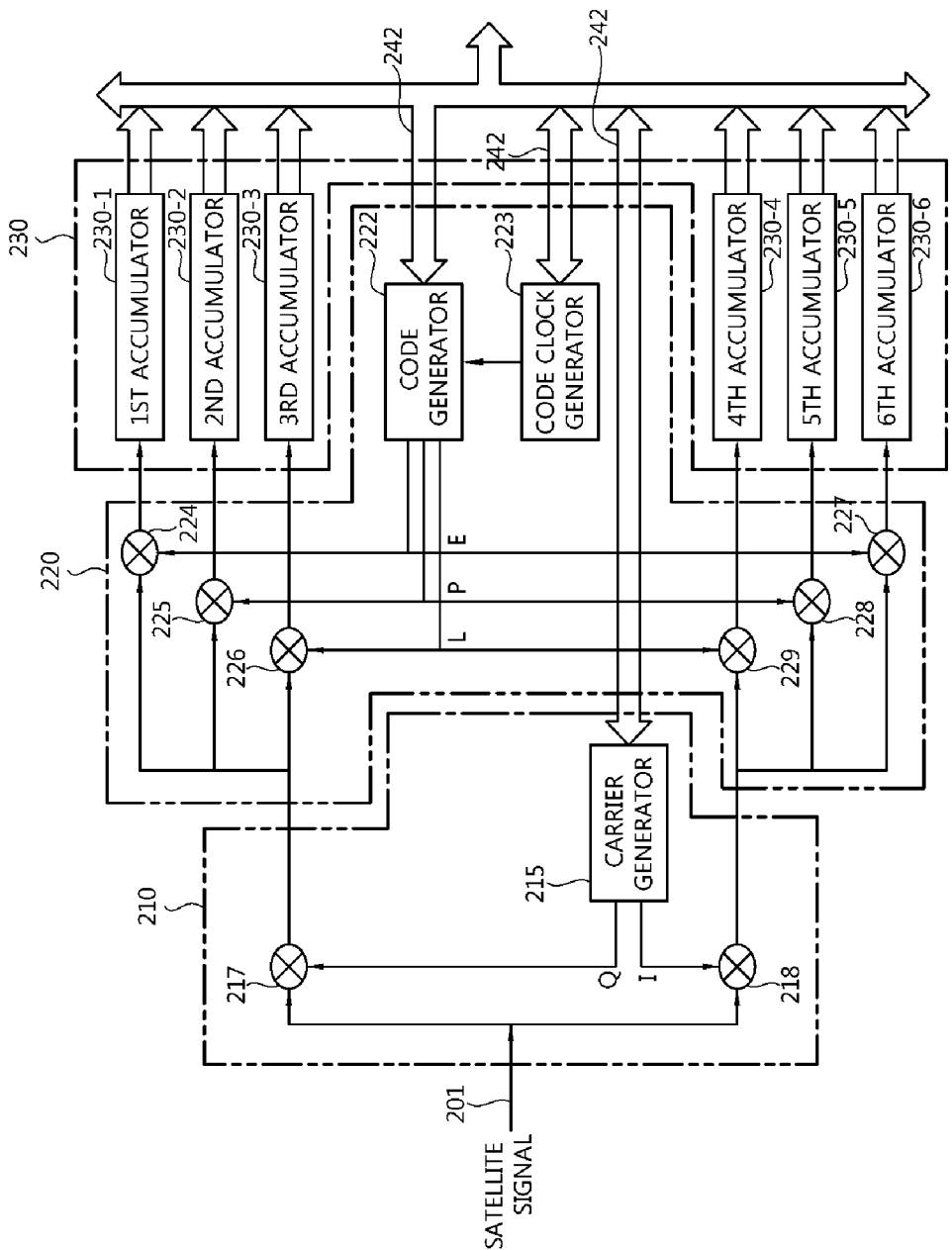
FIG. 3 is a schematic block diagram showing an example of implementation of a sub-tracking module.

FIG. 3 is a block diagram showing an example implementation of a sub-tracking module. The carrier remover 210 includes a carrier generator 215 and carrier mixers 217 and 218. The carrier generator 215 generates a carrier whose frequency is varied according to the control signal 242 received from the tracking loop 240. The carrier mixers 217 and 218 remove the carrier applied by the satellite that transmitted the satellite signal 201 by mixing the received satellite signal 201 and the generated carrier. In the example shown in FIG. 3, the two carrier mixers 217 and 218 are provided to remove the carrier applied by the satellite by dividing the phase of the carrier generated by the carrier generator 215 into I-phase and Q-phase.

The code remover 220 includes a code generator 222, a code clock generator 223, and code mixers 224, 225, 226, 227, 228, and 229. The code clock generator 223 generates a clock signal based on the control signal 242 received from the tracking loop 240. The code generator 222 generates a code based on the control signal 242 from the tracking loop 240 and the clock signal. The code generator 222 generates the code that includes a Prompt (P) code, an Early (E) code and a Late (L) code of a delay within one chip with respect to the phase of the carrier, namely, the I-phase and the Q-phase. The code mixers 224 to 229 remove the code applied by the satellite from the satellite signal 201 by using the code generated by the code generator 222.

The accumulator 230 accumulates the carrier removed and code removed signal outputted from the code remover 220 for an integral time, and outputs a correlation signal. The correlation signal generated by the accumulator 230 may be the result of correlation between the I-phase signal and the P, E, and L codes, and of the correlation between the Q-phase signal and the P, E, and L codes during the integral time. The accumulator 230 may include accumulators 230-1, 230-2, 230-3, 230-4, 230-5, and 230-6 corresponding to the number of the code mixers 224 to 229 included in the code remover 220.

Referring back to FIG. 1, the integral time can be set to be different for the each sub-tracking modules, and the accumulator of the sub-tracking module performs accumulation (integration) for a pre-set integral time. Even when one of the three sub-tracking modules 130-1 to 130-3 loses the satellite signal, the corresponding sub-tracking module that lost the signal can continuously update the control signal by using data outputted from the other sub-tracking modules that have not lost the signal. If the signal sensitivity of the sub-tracking modules 130-1 to 130-3 is set to be different, the first sub-tracking module 130-1 with the best signal sensitivity (namely, good signal sensitivity) may first lose the satellite signal. In this case, remaining sub-tracking modules 130-2 and 130-3 with lesser signal sensitivity can continue to track the satellite signal. The first sub-tracking module 130-1 can continuously update the control signal by using the tracking signals of the other remaining sub-tracking modules 130-2 and 130-3. If the first sub-tracking module 130-1 acquires the satellite signal again based on a change in the satellite, the first sub-tracking module 130-1 reacquiring the signal can immediately recognize a signal acquisition search range, so the signal re-acquisition time can be reduced.

Because the three sub-tracking modules 130-1 to 130-3 use each different integral time, even when one of the sub-tracking modules loses a signal, the control signal of the corresponding sub-tracking module which has lost the signal can be continuously updated by using the data outputted from the other remaining sub-tracking modules, thereby reducing the signal re-acquisition time.

If the signal strength, e.g., a signal-to-noise ratio (SNR), of the received satellite signal is lower than a threshold value, each sub-tracking module may determine that a signal is missing (namely, a signal has been lost). As the integral time shortens, the threshold value of the signal strength of a receivable signal is reduced, so the satellite signals may be frequently lost.

Figure 4:
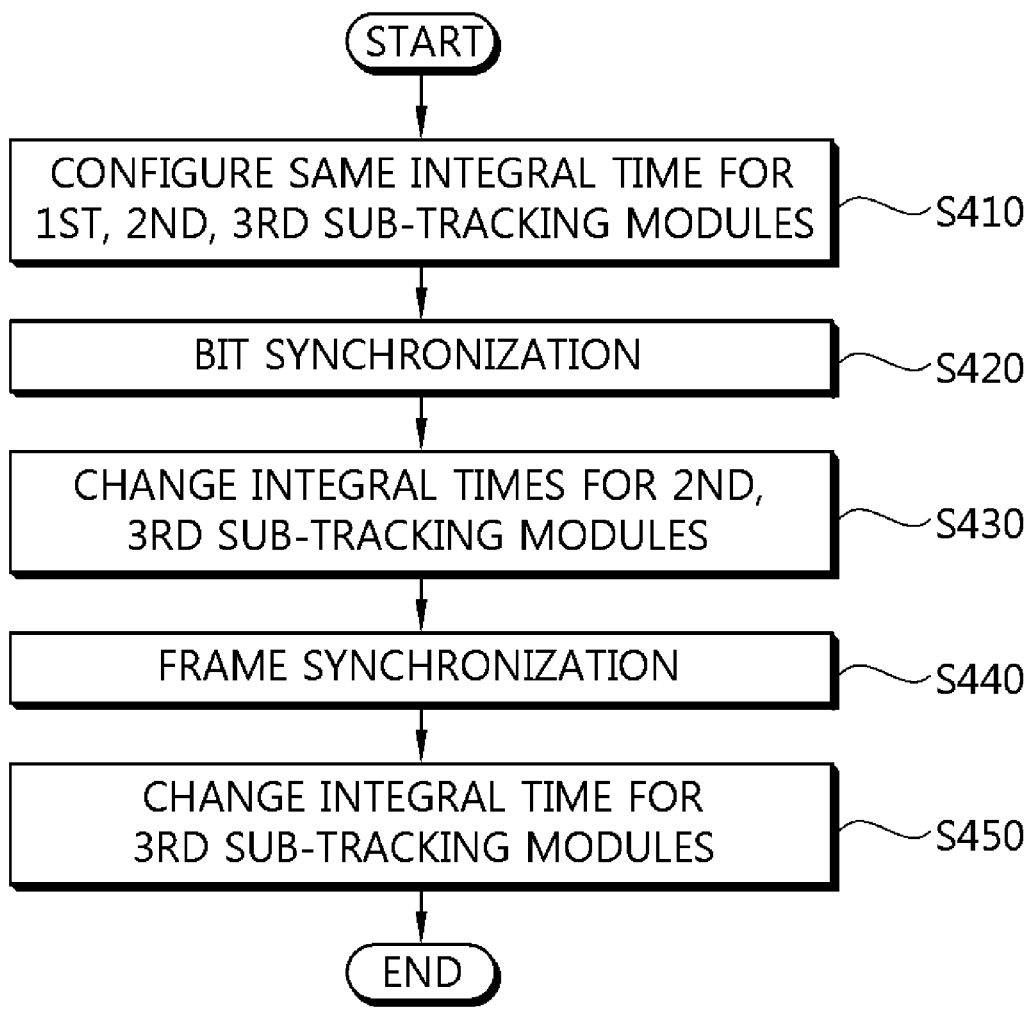
FIG. 4 is a flow chart illustrating a method for setting an integral time.

FIG. 4 is a flow chart illustrating an example method for setting an integral time. The same initial integral time, e.g., 1 ms, is set (configured) for all of the sub-tracking modules 130-1 to 130-3 (S410).

After the sub-tracking modules 130-1 to 130-3 start with the same initial integral time of 1 ms, when integration results (namely, correlation values) are transferred to each tracking loop, each tracking loop performs bit synchronization based on the integral results (S420). The respective sub-tracking modules 130-1 to 130-3 discriminate the position of data bits based on the integral results. For example, the position of bits may be discriminated by a method of phase locked loop changing from 0 to 1 and from 1 to 0 appearing in the received data.

With the integral time of the first sub-tracking module 130-1 maintained at 1 ms, the initial integral time for both the second and third sub-tracking modules 130-2 and 130-3 is changed to a next integral time, such as 20 ms, which is a data bit period (S430). Accordingly, the first sub-tracking module 130-1 performs integration at the initial integral time of 1 ms, while the second and third sub-tracking modules 130-2 and 130-3 perform integration at the integral time of 20 ms, the data bit period.

The third sub-tracking module 130-3 performs frame synchronization to determine whether or not one frame of data bit is acquired based on the outputted integral results (S440). When the frame synchronization is acquired, the integral time of the third sub-tracking module 130-3 is changed to a value greater than 20 ms (S450).

As a result, after one frame bit is acquired, the first sub-tracking module 130-1 performs integration at the integral time of 1 ms, the second sub-tracking module 130-2 performs integration at the integral time of 20 ms, and the third sub-tracking module 130-3 performs integration at the integral time of more than 20 ms. Because the second sub-tracking module 130-2 has the integral time longer than that of the first sub-tracking module 130-1, the second sub-tracking module 130-2 cannot lose a signal even in an area of bad or reduced signal sensitivity. In addition, the third sub-tracking module 130-3 has the integral time longer than that of the second sub-tracking module 130-2, so the third sub-tracking module 130-3 has a better signal sensitivity than the first and second sub-tracking modules 130-1 and 130-2. The different integral times of 1 ms, 20 ms and greater than 20 ms are provided for illustrative purposes, and other combinations of integral times can be implemented based on the desired application and environment.

When mobility of a user is high, a first sub-tracking module having the integral time of 1 ms may outperform other sub-tracking modules. Under environment in which the speed/acceleration of the user is high, long integration time may result in the loss of the satellite signal. By using a number of sub-tracking modules having different integral time, the satellite signal can be tracked under an environment which experiences high acceleration.

FIG. 5 is a flow chart illustrating a method for tracking a satellite signal. For the method shown in FIG. 5, the first sub-tracking module 130-1 performs integration at the integral time of 1 ms, the second sub-tracking module 130-2 performs integration at the integral time of 20 ms, and the third sub-tracking module 130-3 performs integration at the integral time of more than 20 ms.

The sub-tracking modules 130-1 to 130-3 check whether or not a satellite signal is missing by using a signal strength of the satellite signal (S510). The signal strength of the satellite signal may be the SNR, and if the signal strength is lower than a certain threshold value, the system may be determined that the satellite signal is missing.

The sub-tracking module, which has lost the satellite signal, updates a control signal by using a correlation signal of the other sub-tracking modules (S520). Namely, if the GPS receiver is located in an area where the signal sensitivity is not good, the first sub-tracking module 130-1 may first lose the satellite signal. Then, the first sub-tracking module 130-1 can continuously update the control signal for generating a carrier and a code based on signals acquired by the other sub-tracking modules (e.g., the second sub-tracking module 130-2 and/or the third sub-tracking module 130-3).

The first sub-tracking module 130-1 that lost the satellite signal determines whether or not the satellite signal has been reacquired (S530). If the signal strength of a received satellite signal is higher than a certain threshold value, the first sub-tracking module 130-1 may determine that the satellite signal has been received again and reacquired.

The first sub-tracking module 130-1, which has reacquired the satellite signal, initiates tracking by immediately applying a suitable carrier and code from the received satellite signal based on the updated control signal (S540). If the first sub-tracking module 130-1 generates the carrier and the code through the reacquired satellite signal, time for generating the control signal may be needed. However, because the first sub-tracking module 130-1 uses the already updated control signal, the immediate application can be possible. Thus, time needed for reacquiring the satellite signal can be reduced and the signal tracking can be initiated more quickly.

When dynamic characteristics of the satellite signal change suddenly, the use of a single tracking module for a single satellite may increase the possibility of signal loss. Thus, techniques, apparatus and systems as described in this specification can be implemented to include for each tracking module, multiple sub-tracking modules. Also, each sub-tracking module can be configured to operate using different integral time and/or signal sensitivity, thereby effectively tracking the satellite signal even in the presence of changing dynamic characteristics.

By tracking a satellite signal in the presence of changing dynamic characteristics of the satellite signal, signal re-acquisition can be quickly performed and a position resolution with high reliability can be obtained. Thus, the reliability of the GPS receiver can be enhanced.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. An apparatus comprising:
a tracking module to generate a satellite-based measurement result by tracking a satellite signal received from a satellite, the tracking module comprising sub-tracking modules, wherein each sub-tracking module is configured to generate the satellite-based measurement result by using a different integral time.

2. The apparatus of claim 1, wherein at least one of the sub-tracking modules comprises:
an accumulator to generate a correlation signal by accumulating the received satellite signal by using a corresponding integral time; and
a tracking loop in communication with the accumulator to generate the satellite-based measurement result based on the generated correlation signal.

3. The apparatus of claim 2, wherein the at least one of the sub-tracking modules further comprises:
a carrier remover in communication with the tracking loop to remove a carrier, which has been applied by the satellite, from the satellite signal and generate a carrier-removed signal; and
a code remover in communication with the tracking loop and the carrier remover to remove a code, which has been applied by the satellite, from the carrier-removed signal and generate a code-removed signal;
wherein the accumulator is in communication with the code remover to generate the correlation signal based on the code-removed signal received from the code remover.

4. The apparatus of claim 3, wherein the tracking loop is configured to output a control signal that controls the carrier remover and the code remover to lock the satellite signal.

5. The apparatus of claim 4, wherein when a signal strength of the received satellite signal is lower than a threshold value, the tracking loop is configured to output the control signal that controls the carrier remover and the code remover by using the satellite signal received by other sub-tracking modules.

6. The apparatus of claim 1, wherein each sub-tracking module has different signal sensitivity to the satellite signal.

7. The apparatus of claim 6, wherein a length of the integral time for each sub-tracking module is inversely proportional to the signal sensitivity of the satellite signal.

8. The apparatus of claim 1, wherein a length of the integral time for each sub-tracking module is inversely proportional to sensitivity of each sub-tracking module to dynamic characteristics of the satellite signal.

9. The apparatus of claim 1, wherein the different integral time for each sub-tracking module is sequentially set based on acquisition of synchronization with the received satellite signal.

10. A method comprising:
receiving a satellite signal from a satellite; and
tracking the satellite signal received from the satellite to generate a satellite-based measurement result, wherein tracking the satellite signal further comprises a plurality of sub-tracking operations, each sub-tracking operation configured to generate the satellite-based measurement result by using a different integral time.

11. The method of claim 10, wherein receiving the satellite signal comprises:
removing a carrier, which has been applied by the satellite, from the satellite signal to generate a carrier-removed signal; and
removing a code, which has been applied by the satellite, from the carrier-removed signal.

12. The method of claim 10, wherein tracking the satellite signal comprises:
integrating the received satellite signal by using each of the different integral times to generate correlation signals; and
when one of the generated correlation signals has lost the satellite signal, tracking the satellite signal by using the other remaining correlation signals.

13. A global positioning system (GPS) receiver comprises:
tracking modules to track satellite signals received from GPS satellites to generate satellite-based measurement results, each tracking module tracking a corresponding GPS satellite; and
a satellite processor in communication with the tracking modules to receive the generated satellite-based measurement results and obtain a position solution from the received satellite-based measurement results;
wherein at least one of the tracking modules comprises:
a first sub-tracking module to track one of the satellite signals received from the corresponding GPS satellite by using a first integral time; and
a second sub-tracking module to track the same satellite signal tracked by the first sub-tracking module and received from the corresponding GPS satellite by using a second integral time.

14. The GPS receiver of claim 13, wherein the at least one of the tracking modules further comprises:
a third sub-tracking module to track the same satellite signal tracked by the first sub-tracking module and received from corresponding the GPS satellite by using a third integral time.

15. The GPS receiver of claim 13, wherein each sub-tracking module comprises:
an accumulator to generate a correlation signal by accumulating the one of the satellite signals by using a corresponding integral time; and
a tracking loop in communication with the accumulator to receive the generated correlation signal and generate a satellite-based measurement value from the received correlation signal.

16. The GPS receiver of claim 15, wherein each sub-tracking module further comprises:
a carrier remover in communication with the tracking loop to remove a carrier, which has been applied by the satellite, from the satellite signal and generate a carrier-removed signal; and
a code remover in communication with the tracking loop and the carrier remover to remove a code, which has been applied by the satellite, from the carrier-removed signal and generate a code-removed signal;
wherein the accumulator is in communication with the code remover to generate the correlation signal based on the code-removed signal received from the code remover.

17. The GPS receiver of claim 16, wherein the tracking loop is configured to output a control signal that controls the carrier remover and the code remover to lock the satellite signal.

18. The GPS receiver of claim 17, wherein when a signal strength of the received corresponding satellite signal is lower than a threshold value, the tracking loop is configured to output the control signal that controls the carrier remover and the code remover by using the satellite signal received by other sub-tracking modules.

19. The GPS receiver of claim 13, wherein each sub-tracking module has different signal sensitivity to the received one of the satellite signals.

20. The GPS receiver of claim 19, wherein a length of the integral time for each sub-tracking module is inversely proportional to the signal sensitivity of the satellite signal.

* * * * *